July 15, 1924.  1,501,390

F. A. BOLTON

CONTAINER FOR HOLDING AND DELIVERING POWDER

Filed April 14, 1923

Inventor:
Frank Arthur Bolton
Per: Rayner &co
Attorneys.

Patented July 15, 1924.

1,501,390

UNITED STATES PATENT OFFICE.

FRANK ARTHUR BOLTON, OF LONDON, ENGLAND.

CONTAINER FOR HOLDING AND DELIVERING POWDER.

Application filed April 14, 1923. Serial No. 632,160.

*To all whom it may concern:*

Be it known that I, FRANK ARTHUR BOLTON, subject of the King of Great Britain and Ireland, residing at 41 Minster Road, Cricklewood, London, England, have invented a new and useful Container for Holding and Delivering Powder, of which the following is a specification.

My invention relates to a container for holding tooth powder and like material, and which is adapted to deliver or eject small quantities of the material for use as required.

According to this invention, a fixed cylindrical outer body is mounted upon or formed with a base, and provided with an aperture at one side near its lower edge through which the material such as tooth powder or the like will be delivered or ejected into a small tray or receptacle provided upon the base in front of the aperture.

Mounted in the outer body is a rotatable cylindrical container in the base of which is arranged a cone adapted to be rotated with the container. The apex of the cone projects up into the receptacle, and its sloping sides lead down to its lower edge so as to direct the material outwardly. A series of openings are provided at intervals around the lower edge of the rotatable container, and a removable lid is provided on its top by which the container and its cone may be rotated to traverse these openings past an opening in the front of the fixed outer body, so as to allow the tooth powder or the like to pass out through the opening and fall into the tray provided for this purpose. A fixed blade is provided in the base of the outer body and projects up between the lower edge of the cone and the rotatable container, and this may be slightly inclined so as to assist in ejecting the tooth powder or the like through the aperture in the outer body. The action of rotating the movable container and with it the interior cone, will cause the bulk of the tooth powder or other material in the container to rotate therewith, and when this comes against the fixed blade it will be ejected through the opening and be delivered upon the tray or receptacle, mounted on the base, ready for use.

Such a container for tooth powder or like materials, enables such material to be delivered in small measured quantities for use, thus preventing the waste which frequently occurs when such materials are used in ordinary tins. It also obviates the likelihood of the tooth powder or the like being spoilt by dipping a wet or damp brush into the body of the powder as is frequently done.

In order that my invention may be readily understood, reference is made to the accompanying drawings, in which:—

Figure 1:
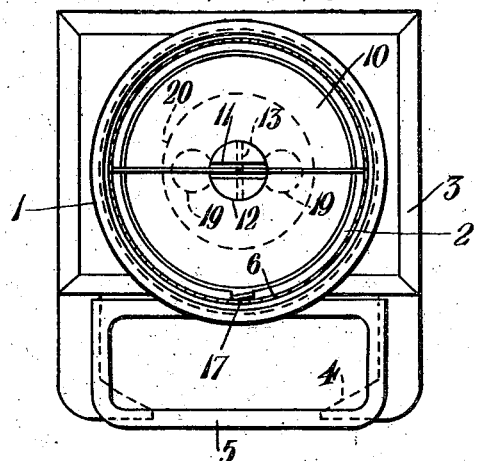
Fig. 1 is a plan of a container for holding and delivering tooth powder or the like constructed according to my invention.
Figure 2:
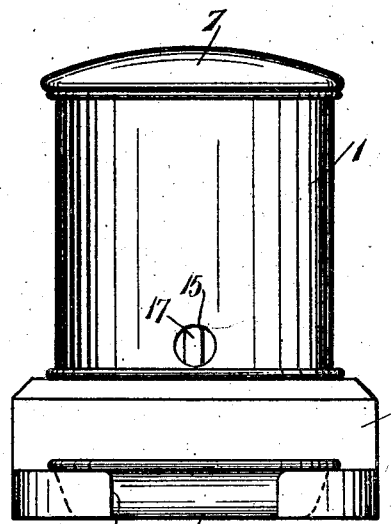
Fig. 2 is a front elevation of the same.
Figure 3:
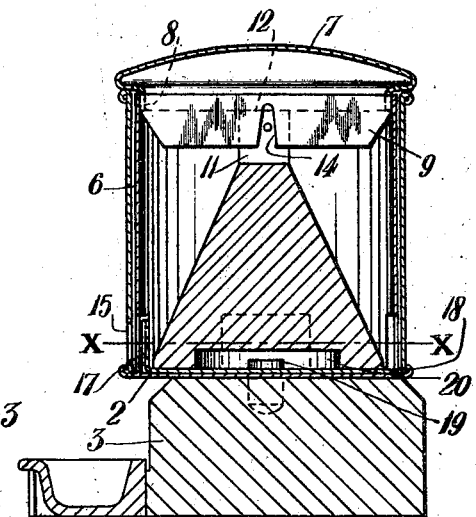
Fig. 3 is a vertical section taken on the centre line of Fig. 2.
Figure 4:
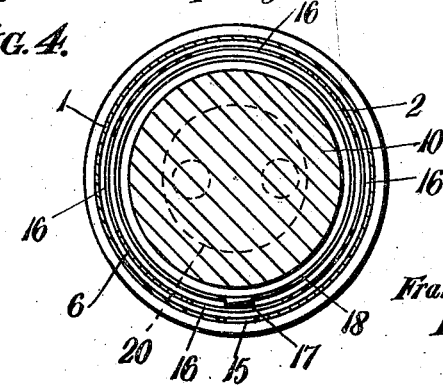
Fig. 4 is a sectional plan on the line X—X of Fig. 3.

Referring to the drawings, the outer cylindrical body 1 is closed at its lower end 2 and fixed upon the base 3. In front of this base 3 is provided a recess 4 to receive a removable tray 5 into which the tooth powder or the like is delivered in small quantities, and from which it may be removed by a tooth brush or other suitable means.

Loosely fitting into the outer body 1 is a cylindrical casing 6 adapted to be rotated by the detachable lid 7 arranged in its upper end. This detachable lid 7 has a downwardly projecting edge 8 slotted upon opposite sides to engage a blade 9 fixed in the top of the rotatable container 6 and extending diametrically across it. Within the rotatable container 6 is mounted an upright cone 10 whose lower edge leads down close to the lower edge of the rotatable container. This cone 10 is adapted to be rotated with the rotatable container 6, by means of the blade 9 which engages in a slot 11 in the projection 12 upon the upper end of the cone, and a transverse pin 13 is provided in this projection to engage in a slot 14 in the blade 9.

In the front of the outer body near its lower edge is a delivery aperture 15, through which the tooth powder or the like is ejected into the tray 5. The rotatable container 6 is provided with four openings 16 arranged at equal intervals around its lower edge to permit tooth powder or the like to be ejected through the delivery aperture 15 at each quarter turn of the lid 7. When one of these openings 16 is traversed past the delivery aperture in order to assist in directing the tooth powder or the like through the aperture 15, an inclined fixed blade 17 is provided on a disc 18 located beneath the base of the cone 10, and held stationary by means of a pair of fixed pins 19 secured in the base 3, and projecting through suitable apertures in the disc 18. A recess 20 is provided in the base of the cone 10 so that the projecting upper ends of the pins 19 will not interfere with its rotation. The fixed inclined blade 17 projects up between the lower edge of the cone 10 and the lower edge of the rotatable container 6, and since the tooth powder in the container will rotate with it and the inclined cone, it will be pressed against the inclined blade which will thus act to deflect it in an outward direction and through the delivery aperture 15.

I claim:—

1. In a container for holding and delivering powder in small quantities, a fixed cylindrical casing having a delivery aperture therein, an inner container rotatably mounted within the fixed casing and having at least one opening at the bottom of said inner container adapted to be traversed across the delivery aperture when the inner container is rotated, and an upright cone within the inner container having its base circumference in proximity to the base of said container in order to direct the powder through the delivery aperture when said aperture is traversed by an opening in said inner container.

2. In a container for holding and delivering powder in small quantities, a fixed cylindrical casing having a delivery aperture therein, an inner container rotatably mounted within the fixed casing and having at least one opening at the bottom of said inner container adapted to be traversed across the delivery aperture when the inner container is rotated, an upright cone within the inner container having its base circumference in proximity to the base of said container in order to direct the powder through the delivery aperture when said aperture is traversed by an opening in said inner container, a fixed stand on which the casing is mounted, and a receptacle therein for the powder delivered through the delivery aperture.

3. In a container for holding and delivering powder in small quantities, a fixed cylindrical casing having a delivery aperture therein, an inner container rotatably mounted within the fixed casing and having at least one opening at the bottom of said inner container adapted to be traversed across the delivery aperture when the inner container is rotated, an upright cone within the inner container having its base circumference in proximity to the base of said container in order to direct the powder through the delivery aperture when said aperture is traversed by an opening in said inner container, and a fixed blade projecting between the casing and the lower edge of the cone located opposite the delivery aperture and inclined so as to direct the powder outwardly therethrough.

4. In a container for holding and delivering powder in small quantities, a fixed cylindrical casing having a delivery aperture therein, an inner container rotatably mounted within the fixed casing and having at least one opening at the bottom of said inner container adapted to be traversed across the delivery aperture when the inner container is rotated, an upright cone within the inner container having its base circumference in proximity to the base of said container in order to direct the powder through the delivery aperture when said aperture is traversed by an opening in said inner container, a fixed blade projecting between the casing and the lower edge of the cone located opposite the delivery aperture and inclined so as to direct the powder outwardly therethrough, a fixed stand on which the casing is mounted and a receptacle therein for the powder delivered through the delivery aperture.

5. In a container for holding and delivering powder in small quantities, a fixed cylindrical casing having a delivery aperture therein, an inner container rotatably mounted within the fixed casing and having at least one opening at the bottom of said inner container adapted to be traversed across the delivery aperture when the inner container is rotated, an upright cone within the inner container having its base circumference in proximity to the base of said container in order to direct the powder through the delivery aperture when said aperture is traversed by an opening in said inner container, a removable lid to the inner container, a fixed blade extending across the inner container and forming a driving engagement with the lid, a slot in the cone through which this blade passes so as to cause the cone to rotate with the container when the latter is turned by the lid.

6. In a container for holding and delivering powder in small quantities, a fixed cylindrical casing having a delivery aperture therein, an inner container rotatably mounted within the fixed casing and having at least one opening at the bottom of said inner container adapted to be traversed across the delivery aperture when the inner container is rotated, an upright cone within the inner container having its base circumference in proximity to the base of said container in order to direct the powder through the delivery aperture when said aperture is traversed by an opening in said inner container, a fixed stand on which the casing is mounted, a receptacle therein for the powder delivered through the delivery aperture, a removable lid to the inner container, a fixed blade extending across the inner container, and forming a driving engagement with the lid, a slot in the cone through which this blade passes so as to cause the cone to rotate with the container when the latter is turned by the lid.

7. In a container for holding and delivering powder in small quantities, a fixed cylindrical casing having a delivery aperture therein, an inner container rotatably mounted within the fixed casing and having at least one opening at the bottom of said inner container adapted to be traversed across the delivery aperture when the inner container is rotated, an upright cone within the inner container having its base circumference in proximity to the base of said container in order to direct the powder through the delivery aperture when said aperture is traversed by an opening in said inner container, a fixed blade projecting between the casing and the lower edge of the cone located opposite the delivery aperture and inclined so as to direct the powder outwardly therethrough, a removable lid to the inner container, a fixed blade extending across the inner container and forming a driving engagement with the lid, a slot in the cone through which this blade passes so as to cause the cone to rotate with the container when the latter is turned by the lid.

8. In a container for holding and delivering powder in small quantities, a fixed cylindrical casing having a delivery aperture therein, an inner container rotatably mounted within the fixed casing and having at least one opening at the bottom of said inner container adapted to be traversed across the delivery aperture when the inner container is rotated, an upright cone within the inner container having its base circumference in proximity to the base of said container in order to direct the powder through the delivery aperture when said aperture is traversed by an opening in said inner container, a fixed blade projecting between the casing and the lower edge of the cone located opposite the delivery aperture and inclined so as to direct the powder outwardly therethrough, a fixed stand on which the casing is mounted, a receptacle therein for the powder delivered through the delivery aperture, a removable lid to the inner container, a fixed blade extending across the inner container and forming a driving engagement with the lid, a slot in the cone through which this blade passes so as to cause the cone to rotate with the container when the latter is turned by the lid.

9. In a container for holding and delivering powder in small quantities, a base, a fixed casing on this base having a delivery aperture therein, a removable tray in the base situated in front of the delivery aperture and adapted to receive the powder delivered therethrough, an inner container having a number of apertures in its lower edge, a fixed blade across the top of this container, a lid to the container engaging this blade to form a driving connection, an upright cone having sides sloping down to the lower edge of the container, a plate located beneath the cone, pins to prevent the plate rotating, an inclined blade on this plate projecting upwardly between the lower edge of the cone and the inner container and situated opposite the delivery aperture in the fixed casing and arranged so as to direct the powder outwardly through the delivery aperture when an opening in the container is traversed across the aperture.

FRANK ARTHUR BOLTON.